Figure 1:
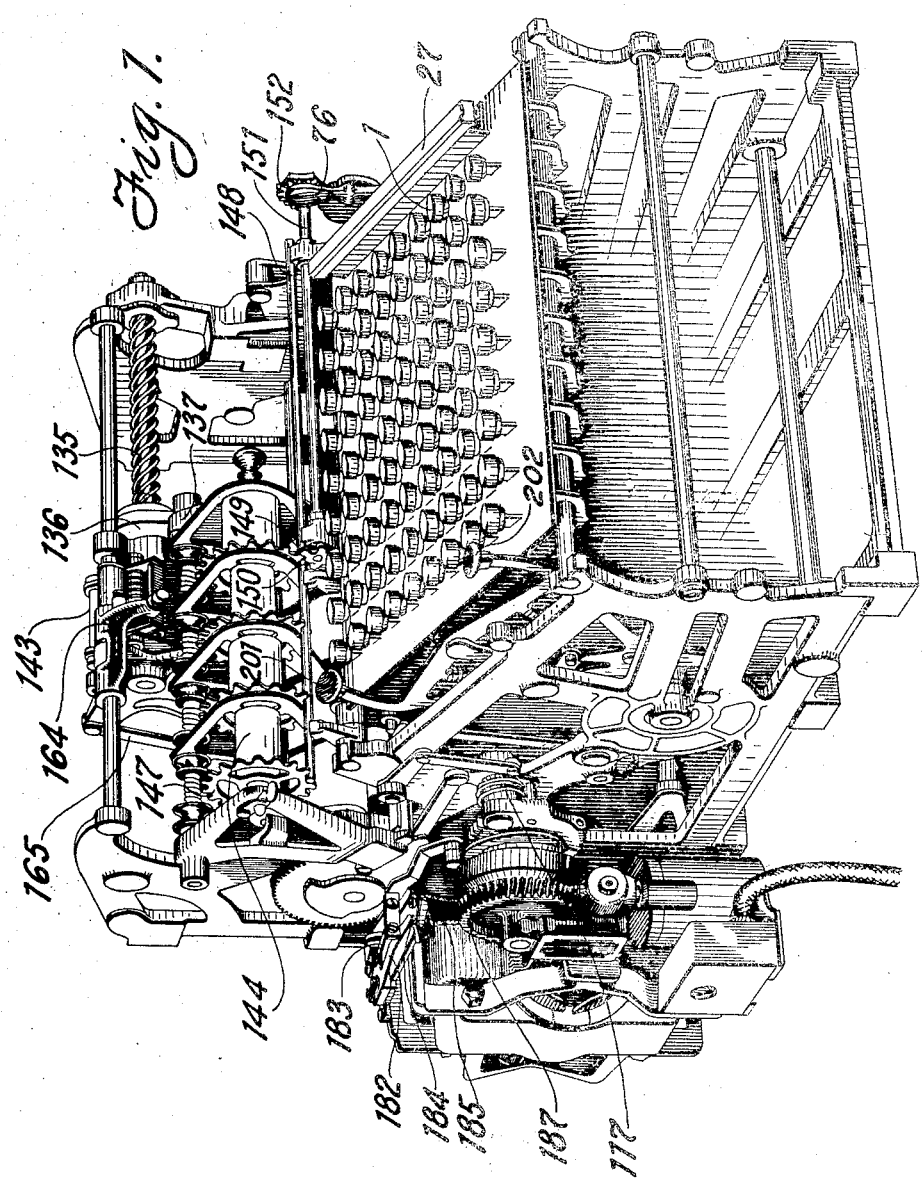

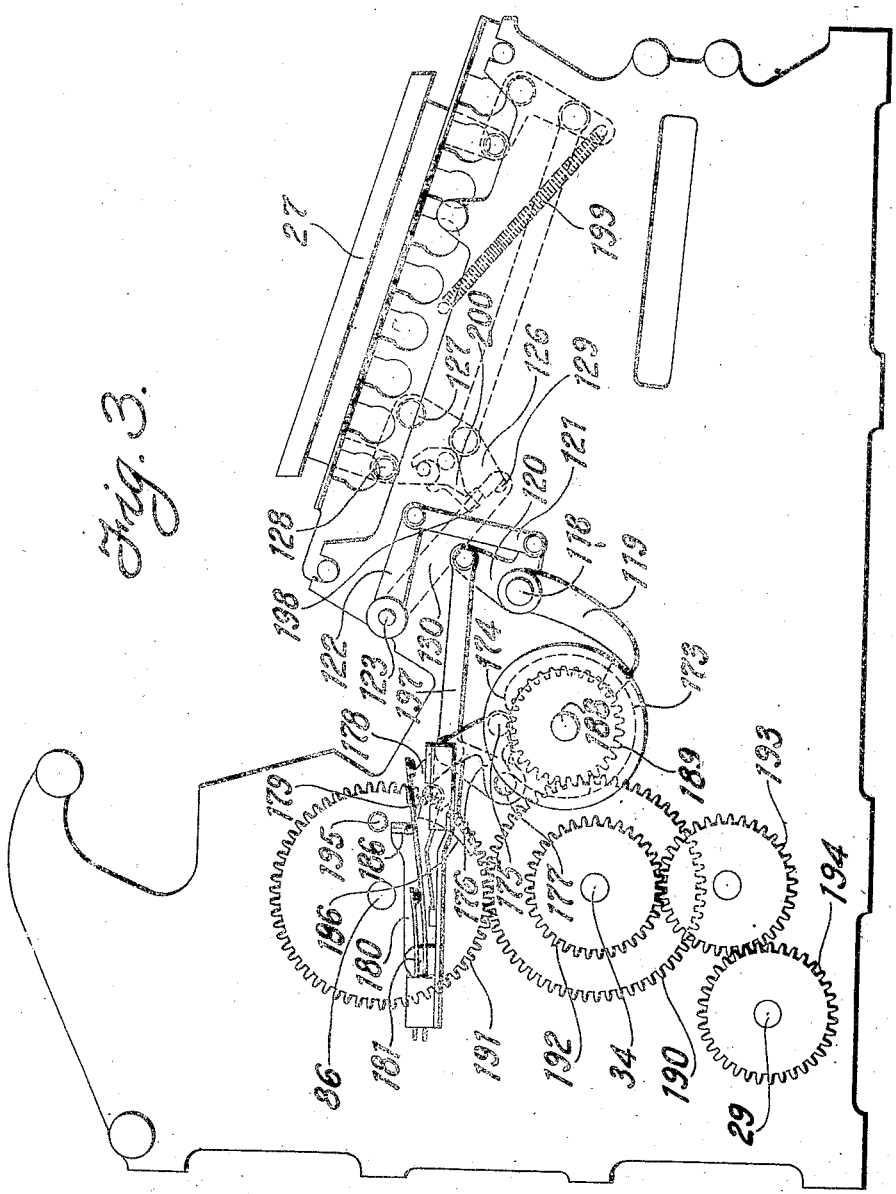

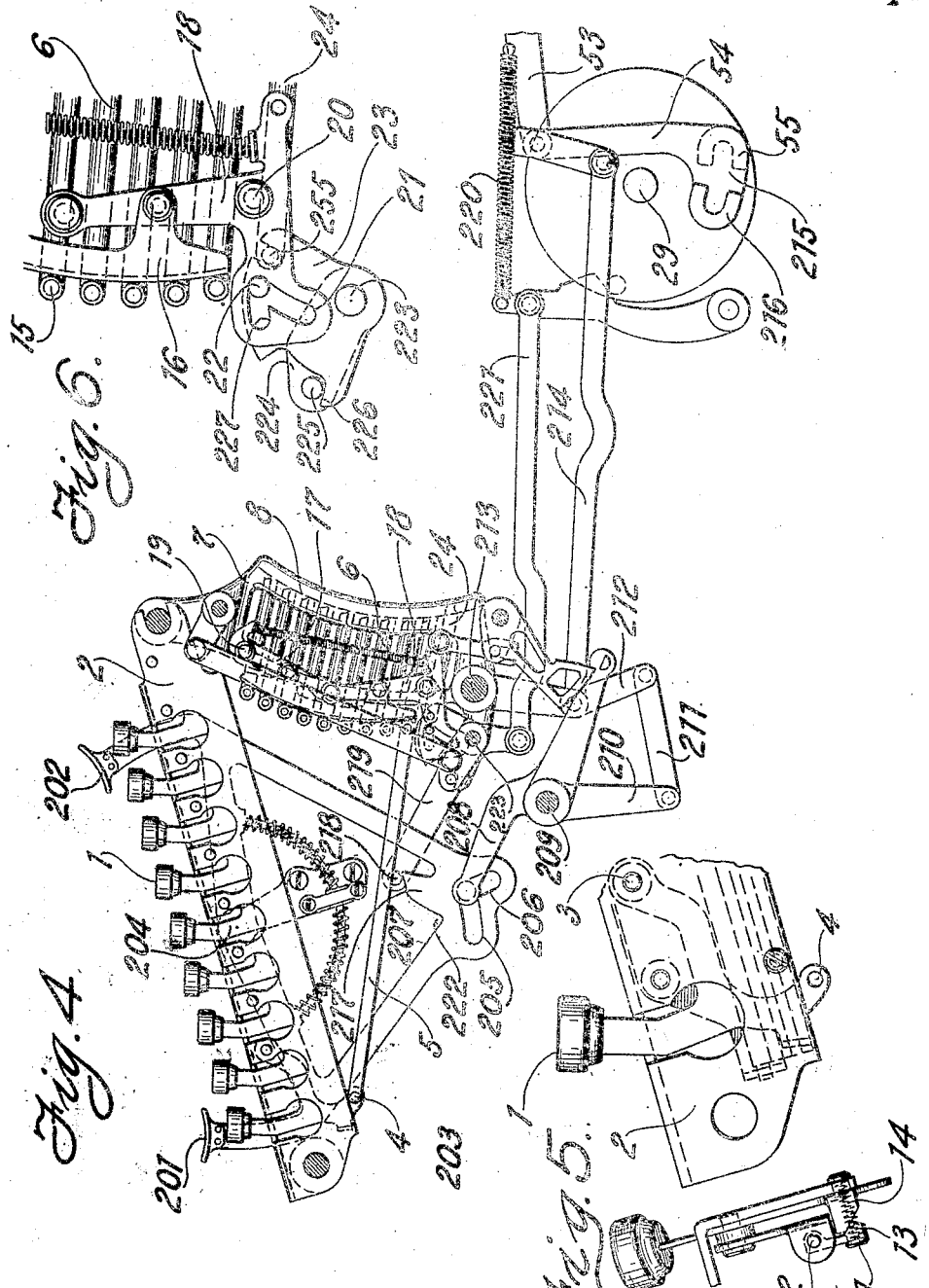

C. F. KETTERING & W. A. CHRYST.
CASH REGISTER.
APPLICATION FILED MAY 26, 1909.

1,110,392.

Patented Sept. 15, 1914.
13 SHEETS—SHEET 5.

Witnesses
Inventors
Charles F. Kettering
William A. Chryst
By Attorneys

C. F. KETTERING & W. A. CHRYST.
CASH REGISTER.
APPLICATION FILED MAY 26, 1909.

1,110,392.

Patented Sept. 15, 1914.
13 SHEETS—SHEET 6.

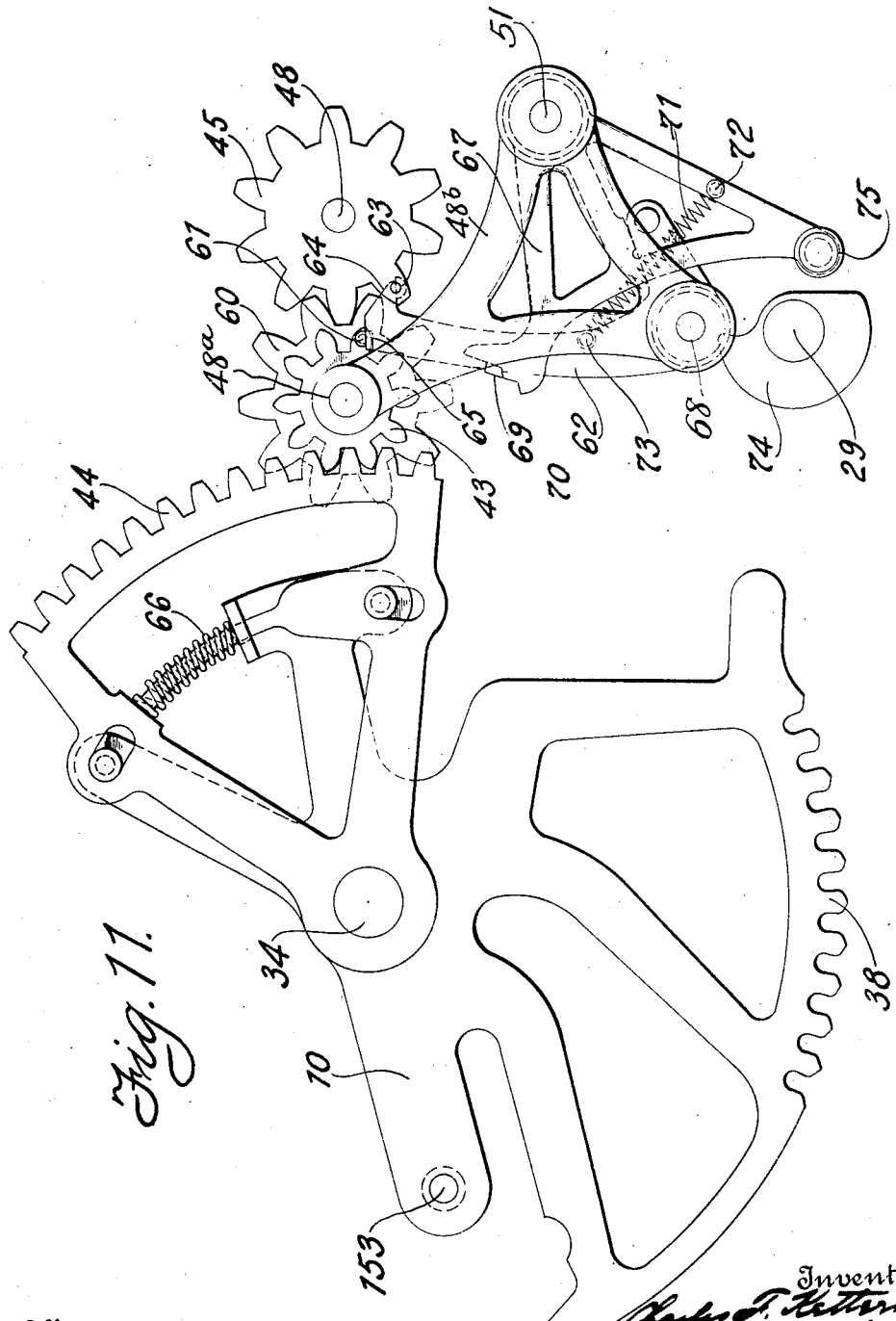

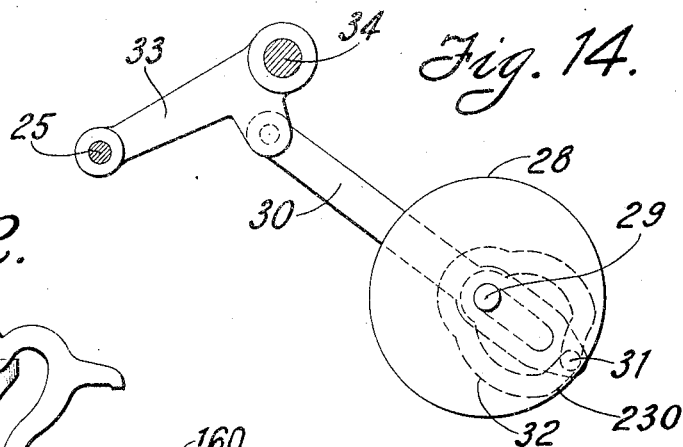
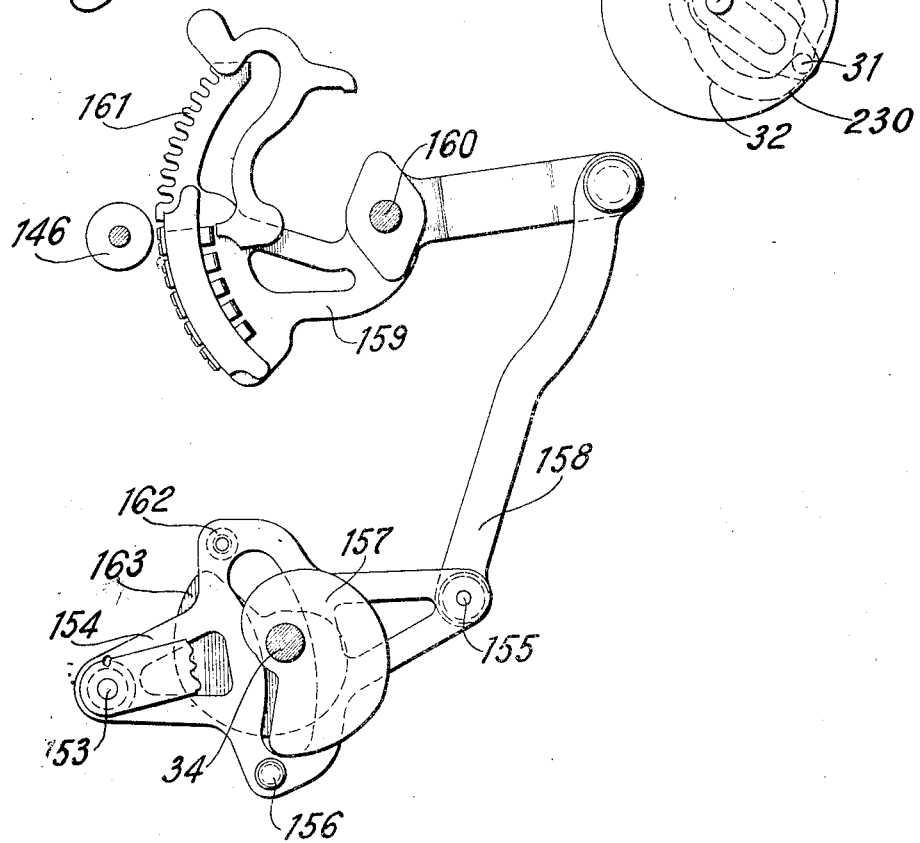

C. F. KETTERING & W. A. CHRYST.
CASH REGISTER.
APPLICATION FILED MAY 26, 1909.

1,110,392.

Patented Sept. 15, 1914.
13 SHEETS—SHEET 11.

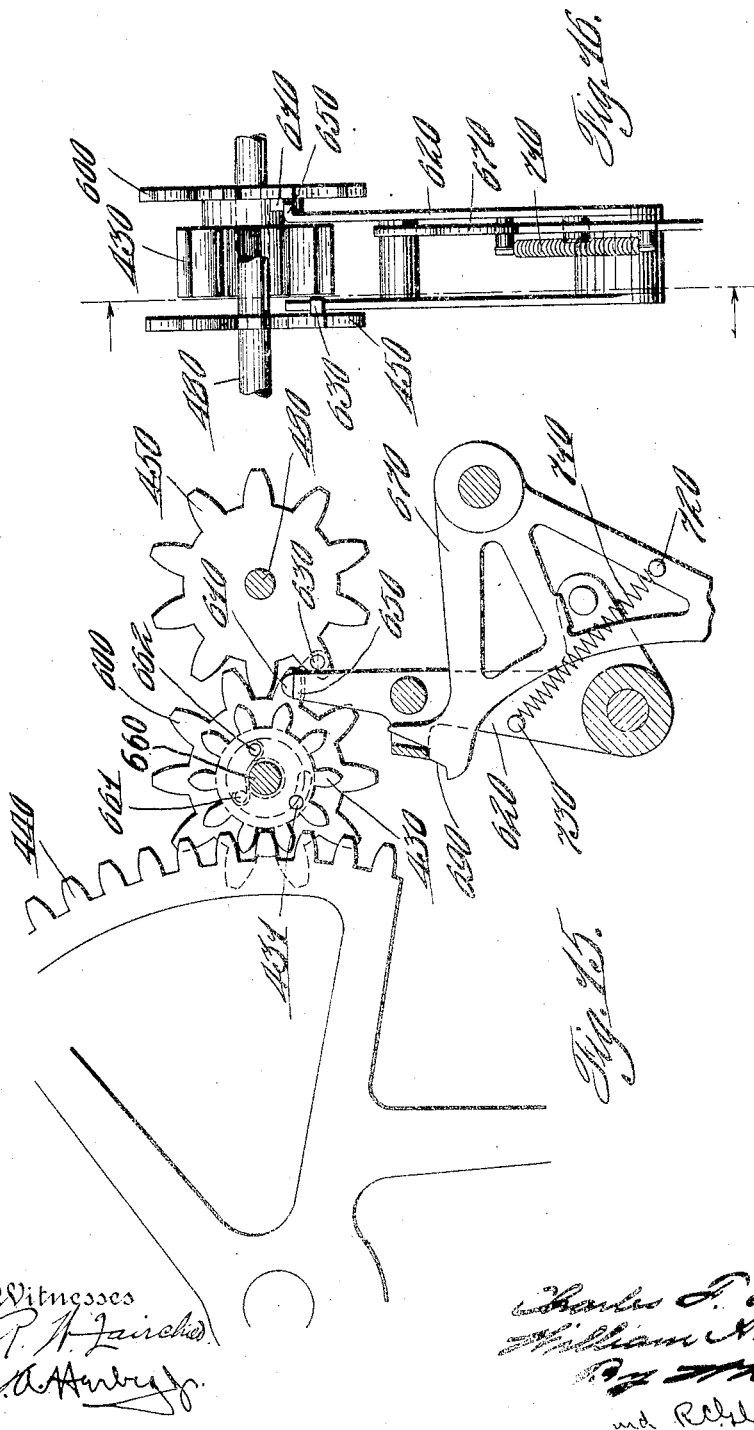

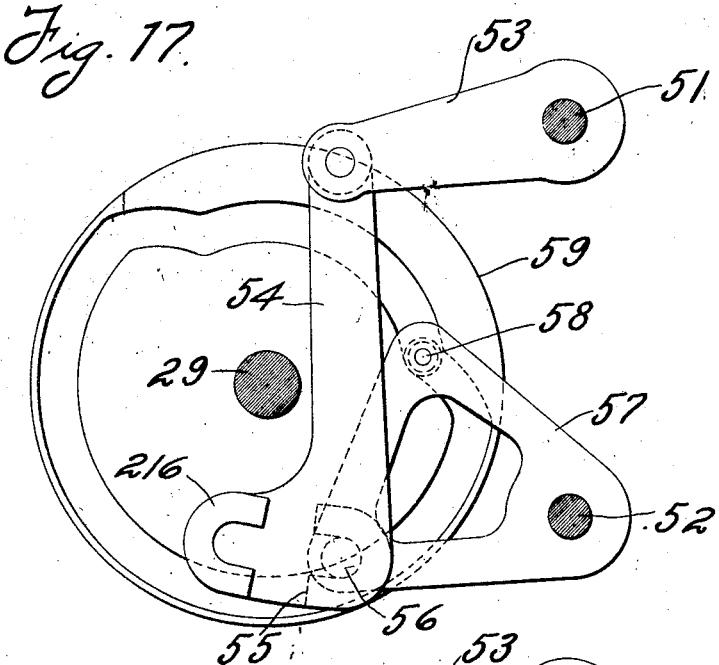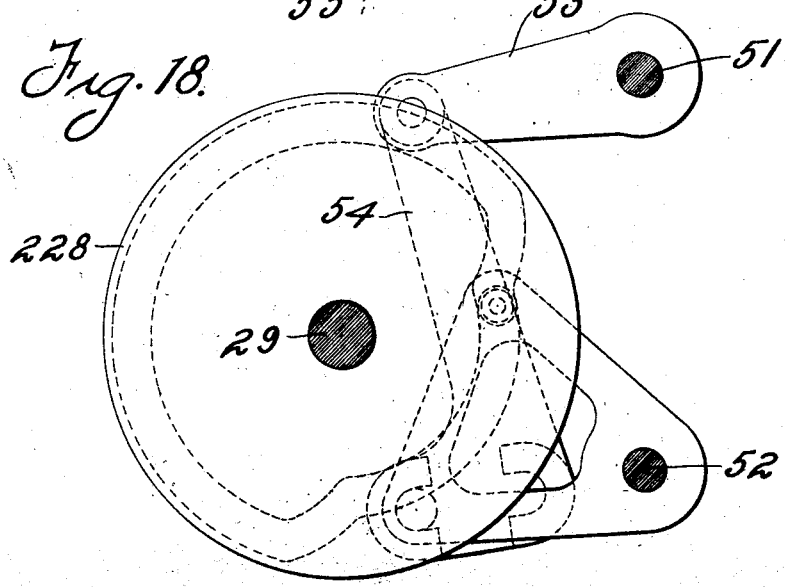

UNITED STATES PATENT OFFICE.

CHARLES F. KETTERING AND WILLIAM A. CHRYST, OF DAYTON, OHIO, ASSIGNORS TO THE NATIONAL CASH REGISTER COMPANY, OF DAYTON, OHIO, A CORPORATION OF OHIO. (INCORPORATED IN 1906.)

CASH-REGISTER.

1,110,392. Specification of Letters Patent. Patented Sept. 15, 1914.

Application filed May 26, 1909. Serial No. 498,548.

*To all whom it may concern:*

Be it known that we, CHARLES F. KETTERING and WILLIAM A. CHRYST, citizens of the United States, residing at Dayton, in the county of Montgomery and State of Ohio, have invented certain new and useful Improvements in Cash-Registers, of which we declare the following to be a full, clear, and exact description.

This invention relates to adding machines.

It is among the objects of the invention to provide an adding machine with a plurality of totalizers and means for actuating any desired totalizer by a single actuating mechanism and without changing the relative positions of the totalizer and the actuating mechanism. The object is accomplished by providing the machine with a selectively shiftable intermediate actuator for transmitting motion from the main actuating mechanism to any desired totalizer.

Another object of the invention is to provide an adding machine with a plurality of totalizers and a plurality of carriers for record strips and printing mechanism with means for causing the printing mechanism to print records upon any one of the strips.

Another object of the invention is to provide an adding machine with a plurality of record strip carrying devices and means for printing upon the record strip of any of said devices, and means for simultaneously entering the recorded amount in a totalizer.

Another object of the invention is to provide an adding machine having a plurality of totalizers and one set of actuating devices with intermediate actuators comprising a plurality of slidable broad pinions which mesh with the actuators and carry gears for meshing with totalizer pinions. These broad pinions are arranged to be slid to carry their respective gears into mesh with any desired totalizer, but still remain in mesh with the actuators.

The present invention is an adding machine comprising a plurality of banks of keys, each bank representing a single denomination, and controlling denominational elements of the differential mechanism. Each denominational element of the differential mechanism includes a segment gear which meshes with a broad gear slidable in the direction of its axis, but not out of mesh with the segment gear. The broad gears each carry a narrow gear of greater diameter than the broad gears. The axial movement of the broad gears serve to bring the narrow gears opposite different sets of totalizer pinions so that when the machine is operated, any desired set of totalizer pinions may be actuated. The totalizers are all mounted upon a single shaft and their pinions are grouped according to like denominations. Thus, if the narrow gears carried by the broad gears are in position to act upon the first pinion of each group, a particular totalizer will be actuated. If the narrow gears are in position to act upon the second pinion of each group, a different totalizer will be actuated. The segment gears of the differential mechanism are spring actuated, and are controlled in their movements by plungers which may be moved into their paths by the keys of the keyboard. Each segment gear controls a corresponding type carrier of the printer. Therefore, the type carriers of the printer will be set to correspond to the movement of the segment gears upon each operation of the machine. It is also possible to actuate the segment gears by returning any one of the totalizers to its zero position, and through the segment cause the type carriers to be set in such position that printing may be made of the total amount which has been added to any totalizer. There is a paper strip carrying device for each one of the totalizers and these paper strip carrying devices are movable with the intermediate actuators so that when any particular totalizer is being actuated the corresponding paper strip carrying device will be opposite the printing mechanism and receive printed records of the amounts which are added to such totalizer and also will receive the printing of the total which has been recorded in the totalizer, if the totalizer is reset.

The various cams and driving mechanism of the machine are operated by a motor, and the driving mechanism is arranged to restore the segment gears of the differential mechanism to their zero positions after each operation of the machine. In a great many respects the machine shown in the drawings is similar to the machine described in the co-pending applications of Charles F. Kettering and William A. Chryst, Serial No.

427,441, filed Apl. 16, 1908, and Serial No. 451,446, filed Sept. 2, 1908.

The present improvements relate mainly to the first mentioned object of the invention, that is, to provide an adding machine with a plurality of totalizers and a selectively intermediate actuator between the main actuating devices and the totalizers. The improvements also include a plurality of record strip carrying devices which are described in the co-pending application before mentioned, but in this case are shown in connection with an adding machine.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Figure 2:
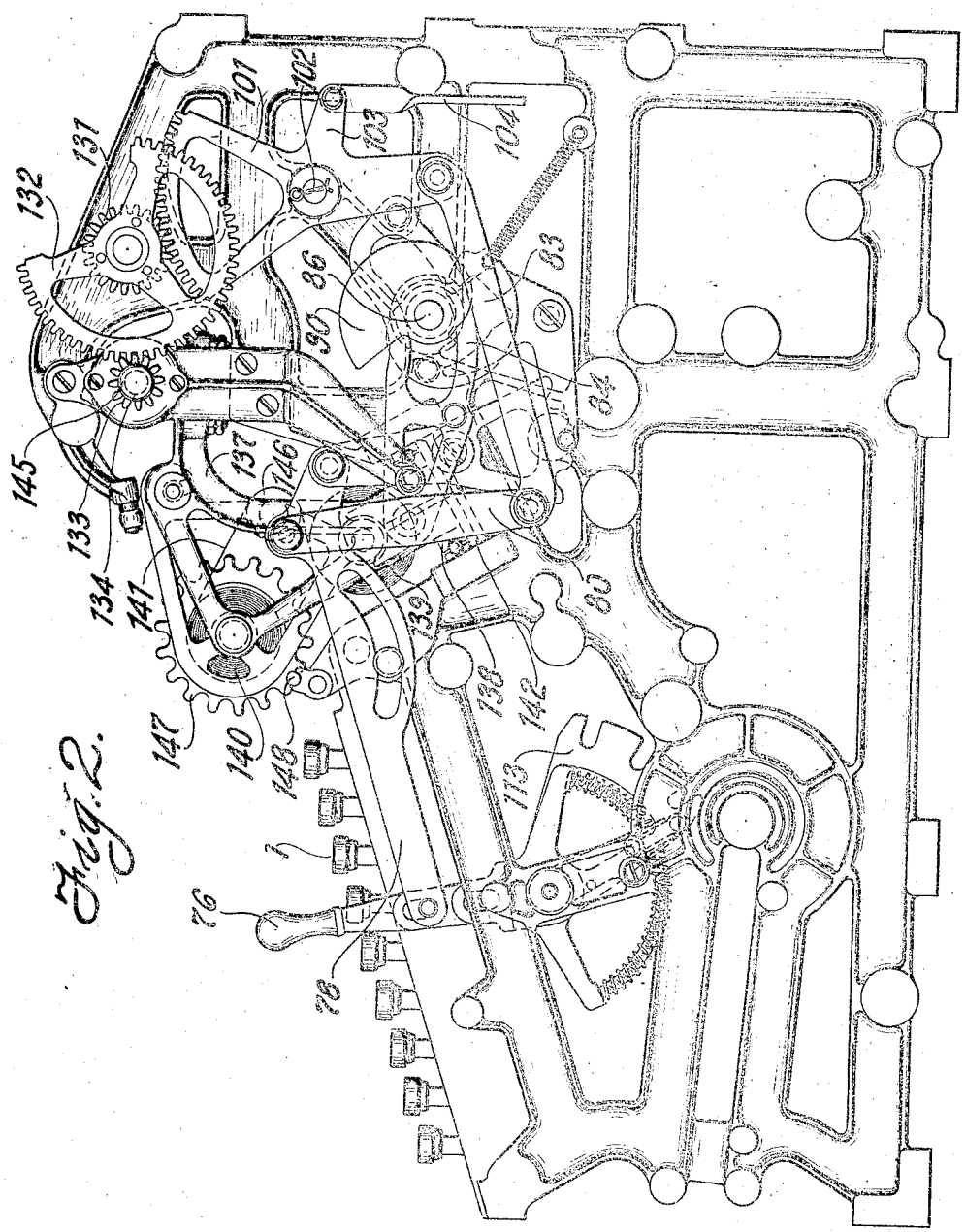
Figure 7:
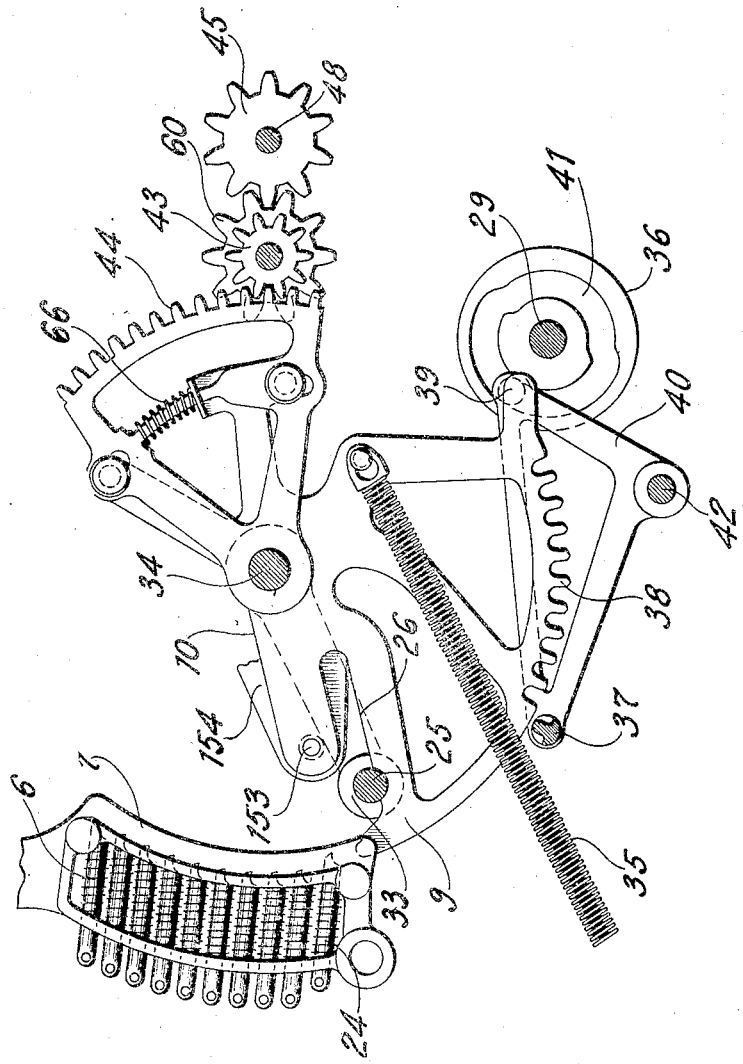
Figure 8:
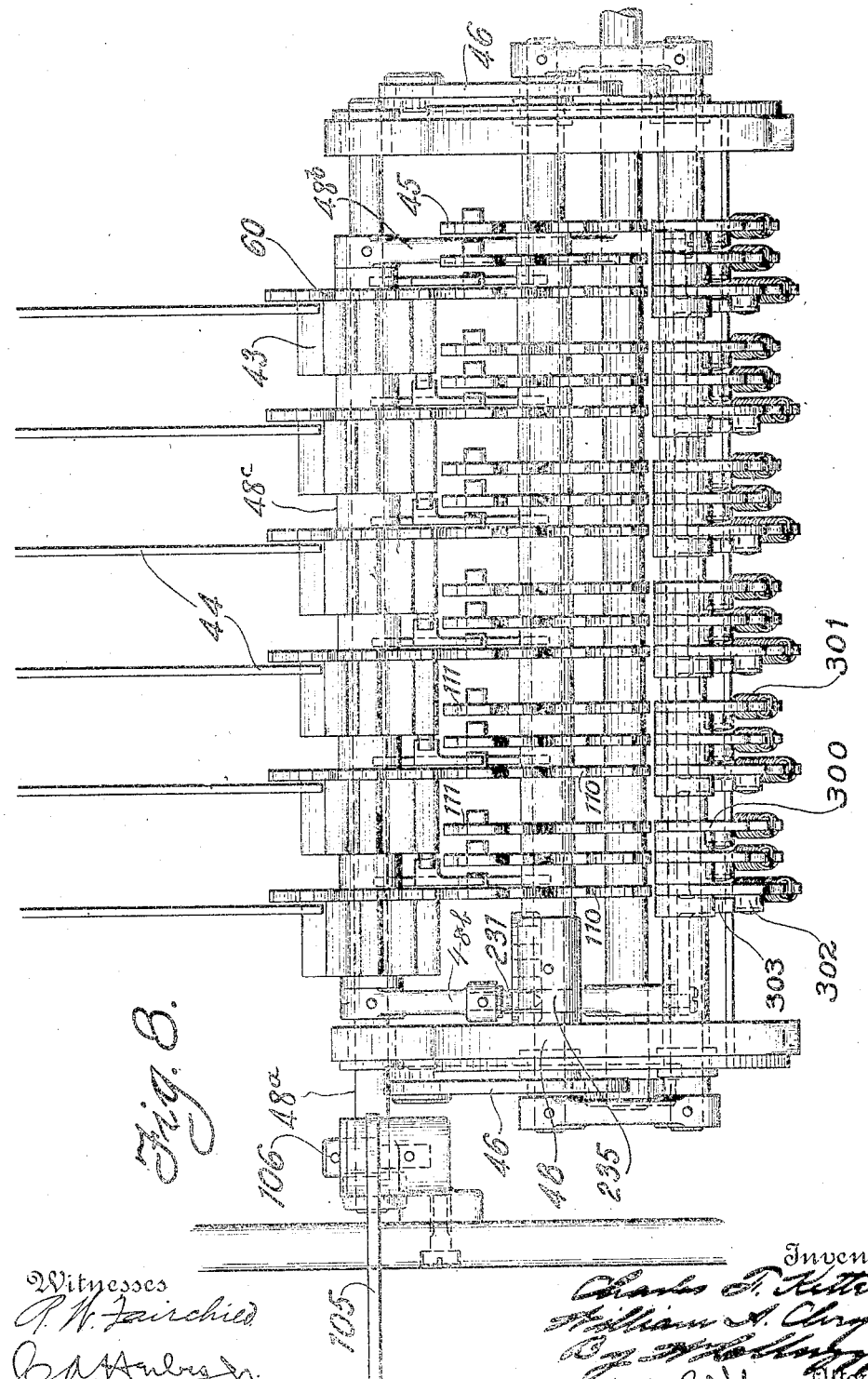
Figure 9:
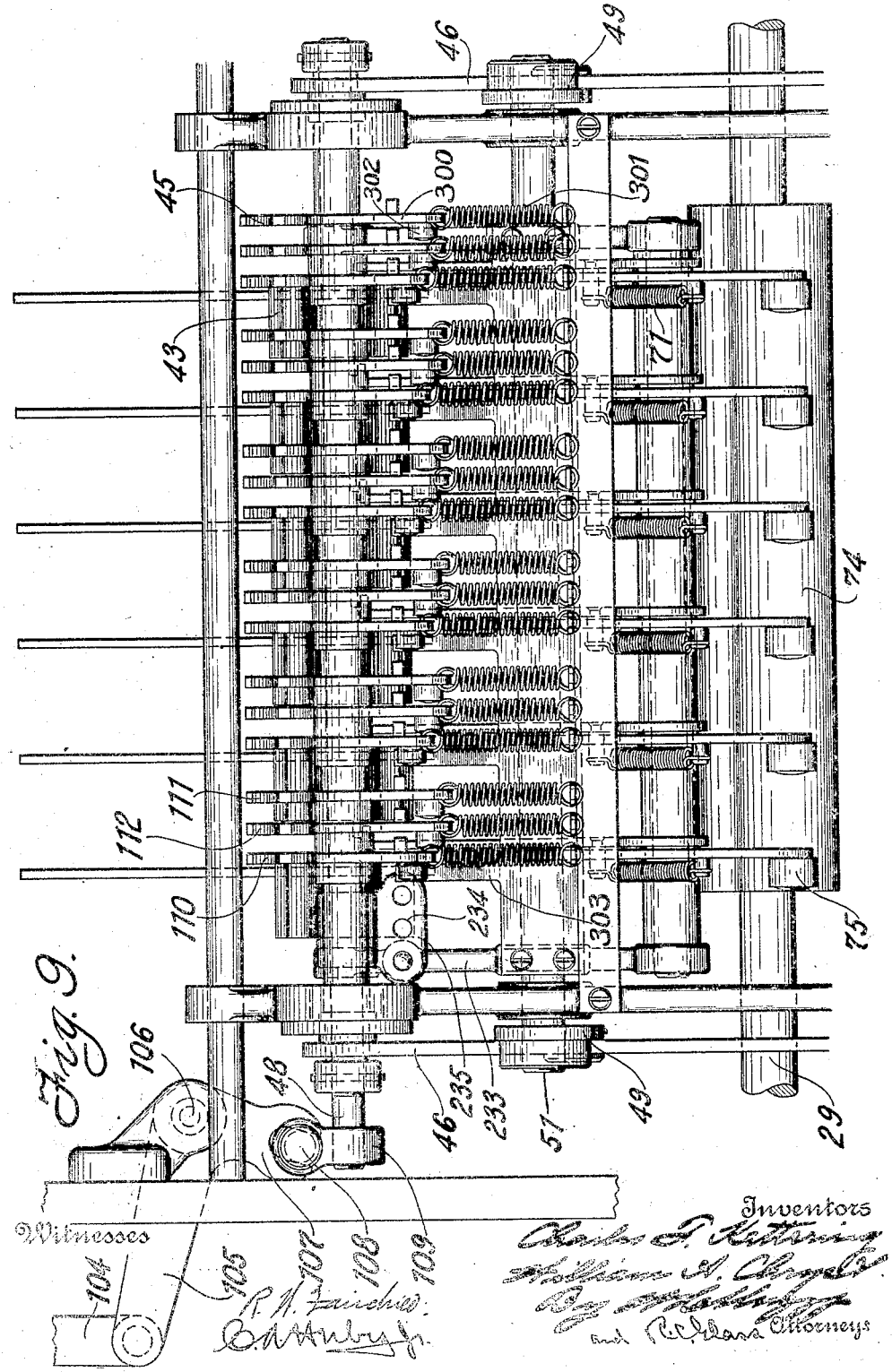
Figure 10:
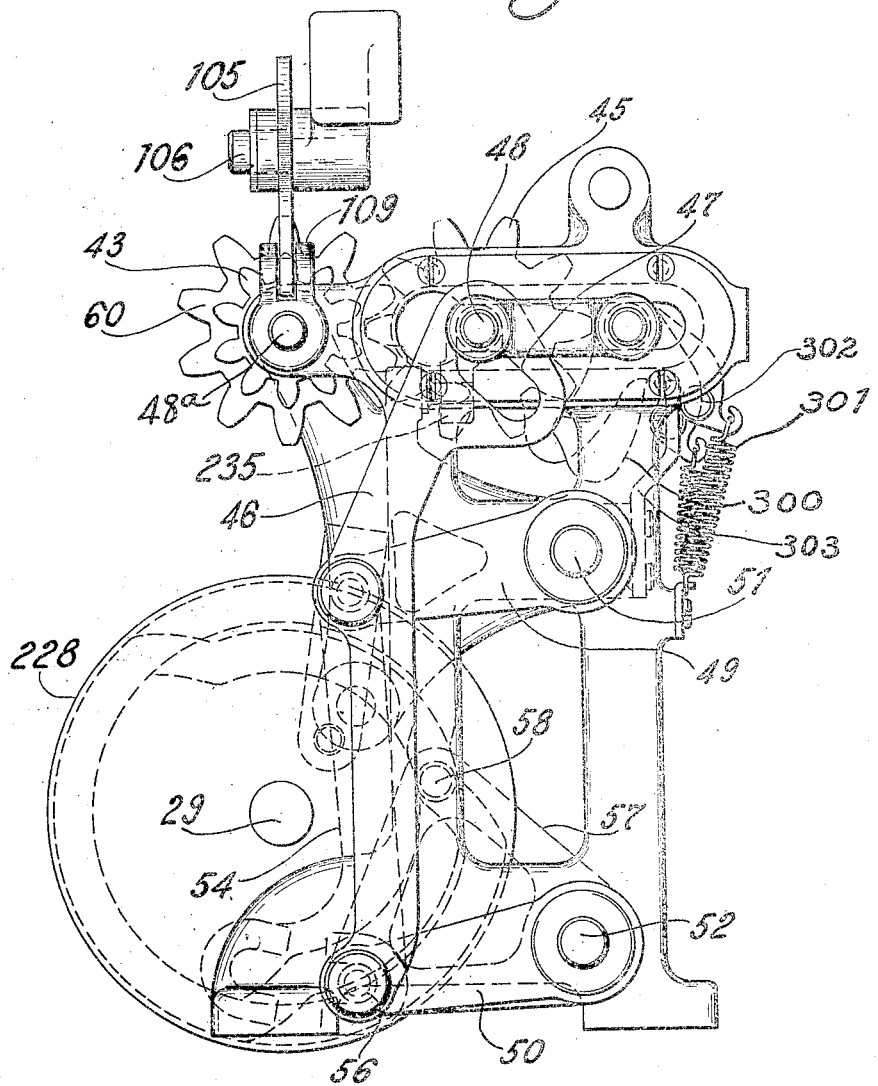
Figure 13:
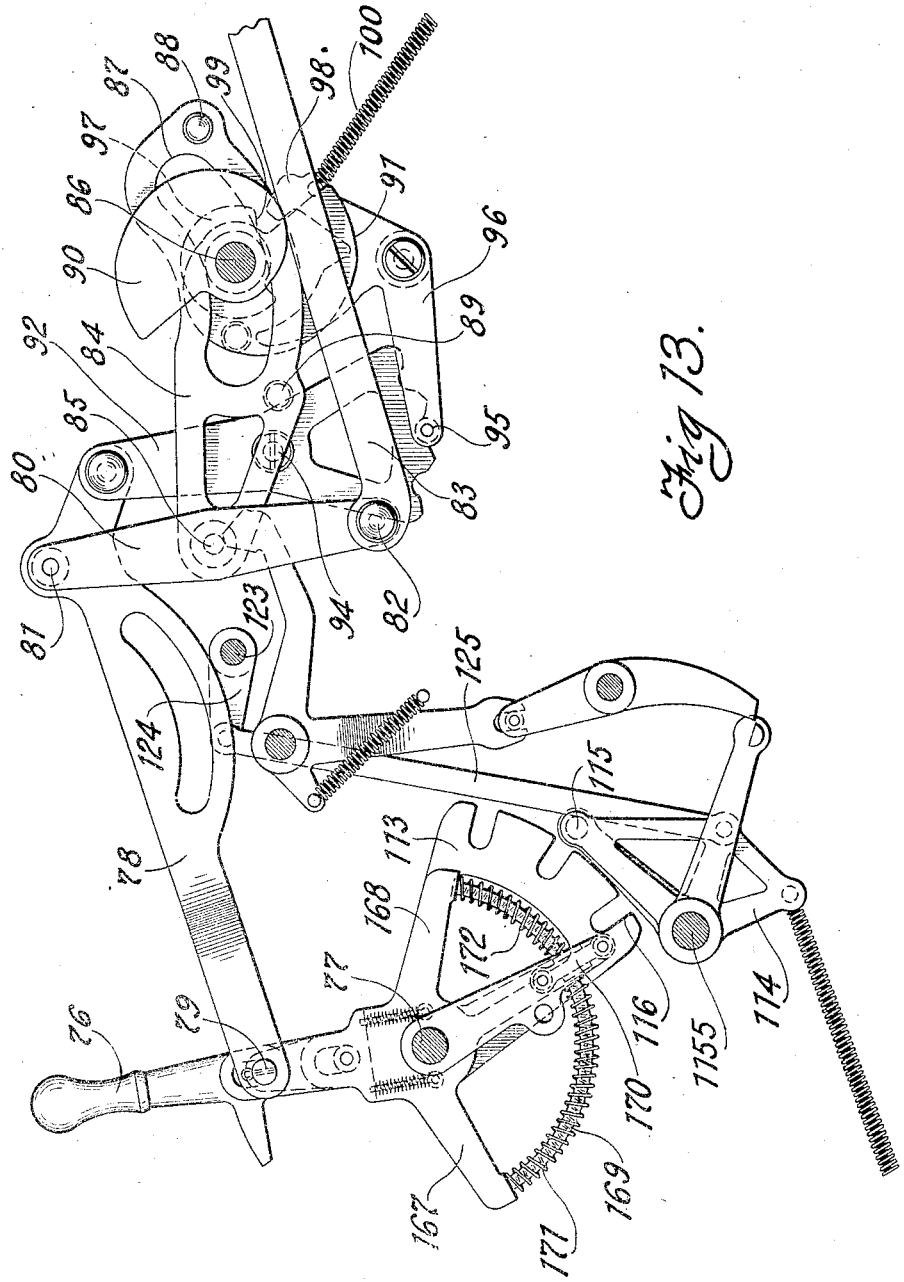

Of said drawings: Figure 1 is a perspective view of the entire machine. Fig. 2 is a right side elevation. Fig. 3 is a left side elevation. Fig. 4 is a side elevation of one bank of keys and mechanism which it controls, and also showing the reading and resetting keys and mechanism controlled thereby. Fig. 5 shows details of one of the keys and the key detent. Fig. 6 is a detail of the controlling mechanism of the zero plunger. Fig. 7 is a side elevation of one set of the denominational elements of the differential mechanism, intermediate actuator and totalizers. Fig. 8 is a top plan view of the multiple totalizers, the intermediate actuators and the segment gears of the differential mechanism. Fig. 9 is a rear elevation of the multiple totalizers. Fig. 10 is a left side elevation of the mechanism shown in Figs. 8 and 9. Fig. 11 is a right side elevation of one of the segment gears of the differential mechanism, the intermediate gear which it actuates and the totalizer pinion which is actuated by the intermediate gear, and the transfer mechanism controlled thereby. Fig. 12 is a detail of one of the type carriers of the printer and the mechanism for setting the same. Fig. 13 is a right side elevation of the mechanism by means of which the sliding intermediate actuator is moved in an axial direction and by means of which any paper strip carrying device is brought to operative relation with the printing mechanism. Fig. 14 is a detail of part of the driving mechanism. Fig. 15 is a detail side elevation of a modification of the transfer devices. Fig. 16 is a rear elevation of said modification. Fig. 17 is a detail elevation of the cam and coöperating parts for moving the totalizer elements into and out of engagement with the intermediate actuators during the ordinary operation of the machine. Fig. 18 is a detail elevation of the cam and coöperating parts for moving the totalizer elements into and out of engagement with the intermediate actuators, when it is desired to take a grand total.

Having reference to the drawings, the machine comprises a plurality of banks of amount keys 1, the keys of each bank being numbered from one to nine, beginning with the lowest keys. The keys of each bank are pivoted to a support 2, on pins 3, (Figs. 4 and 5), and by pins 4 are connected through links 5 to one of the plungers 6. The plungers are slidable in the frame 7 against the action of springs and, when one of the keys is depressed, its corresponding plunger 6 is moved into the channel 8, which is cut in the frame 7, and in which the part 9 of the segment gear 10 travels (Fig. 7). The depressed key is held in its depressed position by a detent 11, which is pivoted on a rod 12, and is spring drawn toward the key by the spring 13. Each key has a bent part 14, which co-acts with the detent 11 to rock the detent away from the bent part 14, when the key is depressed, and then to engage the under side of the detent and prevent the return of the key. With this construction, if a key is depressed by mistake, it may be released by depressing the correct key, as the downward movement of the key rocks the detent 11 laterally, thus permitting any key which is held in its depressed position by the detent to spring upwardly.

Each plunger 6 carries a pin 15, which extends through its respective link 5 and across the forward edge of a plate 16. The plate 16 is carried by a pair of arms 17 and 18 which are pivoted on pins 19 and 20 to the frame 7. Therefore, when a key is depressed through the pin 15 of the plunger, which is actuated engaging the plate 16, the arms 17 and 18 will be rocked rearwardly around their pivot pins. The arm 18 is provided with a cam slot 21, through which extends a pin 22 on an arm 23, to which a zero plunger 24 is pivoted by a pin 255. When the arm 18 is rocked rearwardly, the cam slot 21 rocks the arm 23 to carry the zero plunger 24 out of the channel 8 in the frame 7, and thereby permits movement of the segment 10 for such bank past the zero plunger. If a key is not depressed, the zero plunger will remain in the path of the segment 10 and so prevent its movement past the zero position.

So far, the manner in which the keys control the movement of the segments of the differential mechanism has been described. These segments are all spring actuated and are normally prevented from rocking upwardly by a bar 25, which extends across the upper edge 26 of all of the segments. (See Figs. 7 and 14.) Upon the depression of a motor or starting key 27, the bar 25 is rocked upwardly by the following mechanism. A cam 28 which is mounted upon a main drive shaft 29 causes reciprocation of a pitman 30, which carries a roll 31, extending into the race 32 of a cam 28. The pitman is pivoted at its upper end to a bell crank lever 33, which is loosely journaled upon a shaft 34. The rod 25 is carried by the bell crank lever 33, and extends from the bell crank lever 33 across all of the segments 10 to an arm similar to 33, which is pivoted loosely upon the shaft 34 at the opposite side of the machine.

The drive shaft 29 is caused to rotate once upon each operation of the machine and, when the rod 25 is moved upwardly, springs 35 (Fig. 7) cause the segments 10 to follow the rod 25 until they engage the plungers which have been moved into their paths. When the rod 25 has reached its uppermost position, a cam 36, carried by shaft 29, rocks an alining bar 37 into such alining notches 38 of the segments 10 as are brought opposite the bar. The segments 10 are, therefore, locked in their moved positions while the roller 39 of a frame 40, which carries the bar 37, is in the part 41 of the race in cam 36. There are two of these frames 40, one at each end of the alining bar 37, and both are pivoted on the rod 42.

The upward movement of the segments 10 merely causes the rotation of broad intermediate gears 43, as these mesh with segment gears 44, carried by the segments 10. The totalizer pinions 45 are not adjusted during the upward movement of the segment 10 as the totalizer pinions 45 are rocked out of mesh with intermediate gears 60 fast to the broad intermediate gears 43, before the segments 10 move upwardly, by arms 46, (Figs. 9 and 10). The arms 46 are provided with cam slots 47 surrounding a shaft 48, upon which the totalizer pinions are loosely journaled. The arms 46 are carried by arms 49 and 50 which are secured to the shafts 51 and 52. The rod 51 also carries an arm 53, (Figs. 17 and 18) similar to arm 49, but instead of being connected to one of the slotted arms 46, it is connected to a member 54, which is provided with a flange 55, normally encircling a roll 56, which is carried by a triangular member 57, loosely journaled upon the shaft 52. The member 57 carries a roll 58 extending into the race of a cam 59, so placed upon the shaft 29 that it will cause the triangular member 57 to be rocked upwardly and thereby through the medium of pin 56, flange 55, member 54, arm 53 and shaft 51 cause the cam arms 46 to be carried upwardly before the cam 28 causes movement of the pitman 30. Therefore, the totalizer pinions 45 will be moved out of mesh with the intermediate gears 43 before these gears 43 are rotated by the upward movement of the segments 10. The race in the cam 59 is so formed that it will cause the totalizer pinions 45 to be held out of mesh with the intermediate gears 60, but while the segments are held in their moved positions by the alining bar 37, the cam 59 causes the member 57 to be rocked downwardly, carrying the arms 46 downwardly and thereby returning the totalizer pinions 45 into mesh with the gears 60. After the meshing of the totalizer pinions, the bar 37 is rocked clear of the segments 10, and the pitman 30 then draws the bell crank lever 33 downwardly, causing the rod 25 to engage and return all of the segments 10 to their zero positions. During the return of the segments 10, the segment gears 44, carried thereby, rotate the totalizer pinions 45 through the intermediates 43 and 60, extents which correspond to the extent of the return movements of the segments 10.

From Figs. 8 and 9 it will be seen that there are three totalizer pinions 45 to each one of the gears 60. The totalizer pinions 45 are arranged in groups of three pinions each. The right hand pinions 45 of all the groups together constitute one totalizer, the middle pinions constitute another totalizer, and the left hand pinions of the groups constitute the other totalizer. A shaft 48[a] which carries the gears 43 and 60 may be slid in a longitudinal direction when the totalizer pinions are all out of mesh with the gears 60 to bring the latter opposite any desired set of totalizer pinions, so that the set of pinions will be meshed with said gears 60 upon the lowering of the cam arms 46.

The means by which the shaft 48[a] is moved in a longitudinal direction will be described later, but first the transfer devices by which the carrying operations from one pinion to another are performed, will be described. Each broad gear 43 carries a pinion 61 (see Fig. 11) which, upon the return of the segment gears 44, engages flanges 65 formed on pawls 62, when the segment gears arrive at their zero positions, and prevent the segment gears from further reverse movement beyond their zero positions. The gears 45 each carry a pin 63 so located on the gears that when they have made a complete rotation, the pins will engage inclined surfaces 64 of the pawls 62 and rock said pawls forwardly so that the flanges 65 thereof will be rocked out of the paths of the pins 61 of the broad gears 43, thus permitting the segment gears 44 to rock upwardly one additional tooth space under the action of their springs 66.

The upward movement of the segment gears 44 through the intermediates 43 and 60, causes the respective pinions 45 of the totalizer to which they are geared, to be rotated an additional tooth space. The pawls 62 act between the pins 63 of pinions 45 of a certain denominational order, and the pins 61 of the broad gears 43 of next higher order. Therefore, when they are rocked rearwardly by one of the pins 63, the pinions 45 of next higher order will rotate an additional tooth space and thereby record the complete rotation of the lower order pinions 45, which have caused the forward rocking of the pawls 62.

The pins 63 may engage their respective pawls any time during the return movement of the segments 44, but the segments 44 will not move the additional step until reaching their home positions. It is, therefore, necessary to provide means for holding the pawls 62 in their moved positions until such time. As shown, these means comprise the members 67, which are loosely pivoted on rod 51, and are rocked upwardly by springs 71, connected to pins 72 on members 67 and to pins 73 on pawls 62. The members 67 co-act with lugs 69 of the transfer pawls 62, and when the said transfer pawls are rocked rearwardly, the members 67 swing upwardly so that their shoulders 70 will engage the lugs 69 and hold the pawls in their moved positions. The members 67 are restored to their original positions at the beginning of each operation of the machine by a cam 74, which is carried by the shaft 29. The cam 74 rocks the members 67 by engaging rolls 75 thereon, and, when said members are restored, the springs 71 return the pawls 62 to their normal positions.

The manner of moving the shaft 48$^a$ in a longitudinal direction may be understood from Figs. 2, 13 and 9. The particular totalizer which is to be meshed with the actuator upon the operation of the machine is determined by the handle 76 which may be set to any of three different positions. It is pivoted to the frame of the machine on a stub shaft 77, and a link 78 is pivoted to the handle by a pin 79 and connects the handle with an arm 80, which is pivoted to the link on a pin 81, and by a pin 82 to a link 83, and thus when the handle 76 is rocked around its pivot shaft 77, it causes the arm 80 to rock around its pivot pin 82. A setting member 84 is pivoted to the arm 80 near its center by a pin 85, and is held in a substantially horizontal position by a driving shaft 86, which passes through a slot 87 in the member 84. The setting member carries rollers 88 and 89, which extend from opposite sides of the member 84 into the planes of cams 90 and 91, carried by driving shaft 86. The lever or handle 76, is shown in its normal position in Fig. 13 with the member 84 also in its normal position, and when in such position, the rotation of shaft 86 will not effect the setting of the member 84 as the cams 90 and 91 will not then engage either of the rolls 88, and 89, but, if the handle 76 is moved to either one of its other two positions, it will cause either the roll 88 or the roll 89 to be moved into the paths of their respective cams 90 or 91.

A notched alining member 92, which is pivoted to the frame of the machine on a pin 94, is pivoted at its upper end to the link 78. Therefore, when the handle 76 is rocked, the alining member 92 will be rocked accordingly, and as this member co-acts with a roller 95 on a spring pressed locking device 96, the handle 76 and the mechanism which is movable thereby will be retained in its moved position, and upon the rotation of the shaft 86, will be locked in its moved position by a disk 97, which is carried by the shaft 86, and co-acts with an arm 98 of the locking device 96. The disk 97 has a cut away portion 99, to permit the locking device 96 to be rocked against the action of its spring 100, when the handle 76 is rocked around its pivot 77.

If the handle 76 is rocked to its rearmost position, the roll 89 will be moved into the path of the cam 91. Then upon the rotation of the shaft 86, the disk 97 moves into the path of the arm 98 of the locking device 96, and prevents the alining member 93 from rocking around its pivot 94 and thereby also prevents movement of the link 78. Upon the continued rotation of the shaft 86, the cam 91 engages the roller 89 and returns the member 84 to its initial position, but upon this return of the member 84, the lever 80 can no longer rock around its pivot pin 82, as the link 78 is prevented from moving by the locking device. Therefore, the lever 80 will be rocked around its other pivot pin 81, thus drawing the link 83 forwardly and through it rocking a segment gear 101, (Fig. 2,) which is pivoted on a frame pin 102 and is provided with a rearwardly extending arm 103, to which is pivoted a link 104, connecting said arm with a bell crank lever 105 (Figs. 8, 9 and 10), pivoted on pin 106, and having a forked portion 107 straddling a pin 108, which is carried by a forked member 109, fixed to the shaft 48$^a$. Thus the shaft 48$^a$ will be moved in a longitudinal direction to bring the gears 60 which are fixed to the broad gears 43 into mesh with the totalizer comprised of the pinions 110.

If the handle 76 is rocked to its extreme forward position, it will cause the roll 88 to be brought into the path of the cam 90. Therefore, when the shaft 86 is rotated the cam 90 will engage the roller 88 and return the member 84 to its initial position; but, as at this time, the lever 80 is compelled to rock around its pivot pin 81, it will push rearwardly on the link 83 and thereby rock the bell crank lever 105 upwardly and bring the gears 60 into position to be meshed with the totalizer pinions 111.

With the handle in the position in which it is shown in Fig. 13, which is its middle position, the totalizer, comprising the pinions marked 112 in Fig. 9, will be brought to mesh with the gears 60.

The longitudinally movable shaft 48$^a$ has fast thereto near the ends thereof arms 48$^b$ which are loosely mounted upon the rod 51, see Figs. 8, 9, 10 and 11. These arms 48$^b$ are triangular in shape and at their lower ends support a rod 68 which acts as the pivot for the trip pawls 62. Suitable collars 48$^c$ are mounted upon the shaft 48$^a$, see Fig. 8, to keep the intermediate actuators composed of the gears 43 and 60 properly spaced. The rods 68 and 51 upon which the trip pawls 62 and retaining members 67 are mounted, respectively, are also provided with collars so as to properly space the pawls 62 and the members 67. From this it will be seen that as the shaft 48$^a$ is moved longitudinally the arms 48$^b$ will also be moved, thereby carrying the trip pawls 62 and the retaining members 67 therewith. Previous to the shifting of the shaft 48$^a$ carrying the intermediate actuators, the totalizer elements 45 will be withdrawn from engagement with the gears 60 by the movement of the arms 46, as previously described, so that the shifting of the trip pawls 62 with the intermediate actuators will not be interfered with.

An additional locking and alining disk for this totalizer setting mechanism is shown in Fig. 13, and comprises a notched plate 113 fast to the handle 76 and co-acts with a pin 115, which is carried by a frame 114 pivoted upon the shaft 1155. This frame is caused to be rocked to carry the pin 115 into the particular notch 116, which is opposite said pin, just before the drive shafts of the machine start to rotate by the coiled spring 117 (Fig. 1), which is coiled around the stub shaft 118 (Fig. 3), and causes the arm 119 to rock forwardly upon the depression of the motor key 27. A bell crank lever 120 is fixed to the shaft 118 and is connected by a link 121 and an arm 122 to a shaft 123. Through this construction, when the spring causes the rocking of the arm 119 and the shaft 118 upon which the arm 119 is rigidly secured, the shaft 123 will also be rocked. The shaft 123 carries a crank arm 124 (Fig. 13), which is connected by a link 125 with the frame 114, and because of this connection rocks the frame 114 to carry the pin 115 into one of the notches 116 at the time the shaft 123 is oscillated. The spring 117 is normally prevented from rocking the shaft 118 by a bell crank lever 126, which is pivoted to the frame of the machine on pin 127, and to the motor key by a pin 128, and co-acts with a pin 129, carried by an arm 130, which is fixed to the shaft 123. Upon the depression of the motor key 27, the bell crank lever 126 is rocked away from the pin 129 and thereby permits the spring 117 to rock the shafts 118 and 123.

In order to position the proper record strip for imprint, the segment gear 101, Fig. 2, meshes with a pinion 131 which is fixed to a segment gear 132, and the segment gear 132 meshes with a pinion 133 which is fixed to a shaft 134. The shaft 134 is provided with large helical threads 135, as indicated in Fig. 1. The threads 135 mesh with the threads of a nut 136, which is carried by the frame 137 of a carriage 138, in which are mounted rolls 139 and 140, which carry four ribbons of detail paper 141. The carriage 138 is slidable on a track 142 and, when the shaft 134 is rotated upon the rocking of the segment gear 101, when a desired totalizer is meshed with the gears 60, a corresponding one of the detail strips 141 will be brought opposite the printer 143, as the rotation of the shaft 134, through meshing with the nut 136, will cause the desired transverse movement of the carriage 138. The particular detail strip 141 which is brought opposite the printer upon any operation of the machine corresponds to the totalizer which is brought to operative relation with the totalizer actuators. Therefore, all amounts which are added to any one totalizer will be itemized upon its corresponding detail ribbon 141.

The carriage 138 is alined in its set position by an alining arm 164, which is operated at the proper time by a reciprocating link 165. The manner of actuating this link is not illustrated in the drawings, but is fully illustrated in the drawings of the before mentioned co-pending application.

The setting handle 76 (Fig. 13), is provided with a pair of oppositely extending arms 167, and 168, which are connected by a circular bar 169. This bar is slidable in a fixed bearing 170 and a spring 171 encircles the bar at the left of the bearing, and a spring 172 encircles the bar at the right of the bearing. Therefore, if the handle is moved to either its rear position or its forward position it will be returned to its central position when the pins 115 and 95 are moved out of engagement with the alining members 113 and 93. If the machine is operated without again shifting the handle 76, the totalizer 112 will be actuated and its corresponding detail strip will be printed upon. Thus it is necessary to shift the handle 76 when it is desired to operate the totalizers 110 and 111 only.

There are only three totalizers shown in the drawings, but in Fig. 1 there are four detail strips. The strip 144 cannot be brought opposite to the printer 143 by manipulation of the handle 76, but it may be moved opposite to the printer 143 by hand, simply by unscrewing a thumb nut 145, (Fig. 2), and thereby disconnecting the pinion 123 from the shaft 134. When this is done, the setting of the handle 76 predetermines which of the totalizers will be brought to operative relation with the totalizer actuators, but the mechanism which is set by the handle 76 does not cause the rotation of the spiral 135. Therefore, when the machine is in this condition, all of the items which are added to any of the totalizers are recorded upon the single strip 144.

The rolls 139 are the supply rolls of detail ribbon. The ribbon is led from the supply rolls over a platen roll 146 to the receiving rolls 140. The cylinders of the receiving rolls to which the detail ribbon is fastened are each rigid with one of a set of feeding gears 147. These gears are normally prevented from rotating by a rod 148, which extends across the under side of the gears and engages the teeth thereof. The rod 148 is cut away as indicated at 149, so as not to prevent rotation of the gear 147 which carries the detail strip opposite the printer. The gear 147 which is in this position, meshes with a pinion 150 carried by a shaft 151. A pinion 152 also carried by shaft 151, is actuated by a toothed member (not shown in the drawings), which is, itself, actuated by one of the drive shafts of the machine. The shaft 151 rotates far enough after each printing to cause the ribbon 141 which is printed upon to be fed one space, ready to receive the next impression.

The printing mechanism is not illustrated in detail in the drawings, as it is identical with the printer which is described in the co-pending application before referred to.

Fig. 12 shows one of the type carriers and the connecting mechanism for setting the same, and also one of the type hammers.

A beam 154 is pivoted to each of the segments 10 at 155. Each of said beams is slotted to surround the drive shaft 34, and at its other end being connected to a link 158 by a pin 155. The link is pinned at its upper end to the type carrier 159, which is pivoted on a rod 160, and it will be clear that movement of the beam 154 may cause corresponding adjustment of the type carrier. Rollers 156 and 162 are carried by said beam and are positioned to co-act with driving cams 157 and 163 respectively, for the purpose of restoring the middle part of beam 154 to its normal central position at every operation of the machine, these cams being fast on shaft 34. This movement is found in the prior application No. 451,446, above referred to and serves to set the type carrier from one position to another without a restoration to zero. In Fig. 12 the zero type is at the printing line, and in this position if a segment 10 is rocked upwardly, the roller 156 on beam 154 is carried more or less into the path of cams 157, so that when segment 10 is held in adjusted position by alining bar 37, the rotation of cam 157 will restore the center of beam 154 to its normal central position, thereby positioning the type carrier as many units from zero as the segment 10 is moved. When the segment 10 is returned to zero position, the beam 154 will rock around its pivot pin 155, thereby carrying the other roller 162 into the path of cam 163, as much as roller 156 was in the path of cam 157. At the next operation if no key is depressed, the segment 10 remains in normal position, and, therefore, the rotation of cam 163 will cause it to engage roller 162 and restore the beam 154 to its normal zero position, thereby resetting the type bar.

*Driving mechanism.*—The driving mechanism is arranged to cause the main drive shafts 34, 29 and 86 to make one rotation upon each operation of the machine, and is caused to operate by an electric motor. The motor key 27, when depressed, permits the movement of parts for clutching the motor to the driving mechanism and for closing the circuit. The motor may be of any desired type and its armature shaft carries a small screw or worm which meshes with a screw gear 187 (Fig. 1), fixed to a shaft 188 (Fig. 3), which also carries a gear 189 meshing with a gear 190, fast on shaft 34, and thereby drives the machine. The gear 190 meshes with a gear 191 on shaft 86, and a gear 192 also carried by shaft 34 drives a gear 194 fast on shaft 29 through an intermediate gear 193. The shaft 188 is given two rotations at each operation and thereby shafts 34, 29 and 86 are each given one rotation at each operation.

The machine is normally locked and the motor held unclutched by an arm 119 (Fig. 3), fast on a stub shaft 118, which also carries fast thereto a bell crank lever 120. The arm 119 engages a notch in a disk 173, and a cam disk 174, is connected to disk 173 by a spring in such manner that the cam disk may move slightly ahead of the disk 173, the cam disk being also normally held by arm 119. The bell crank 120 is connected to an arm 122, fast on a shaft 123, through a link 121, and a second arm 130 is also fast on shaft 123, and has at its outer end a pin 129 positioned to be obstructed by a member 126 pivoted at 127 and connected to the motor key 27 by a pin 128. A spring 117 (Fig. 1) coiled around shaft 118 tends to carry the arm 119 away from its locking position, but such movement is normally prevented by the engagement of arm 126 with pin 129. When, however, the motor key is depressed, as hereinbefore stated, the arm 126 moves out of the path of pin 129, and the spring 117 may then operate carrying arms 122 and 130 upwardly, thereby withdrawing arm 119 from latching position and causing pin 129 to engage a cut away portion 198 of arm 126, and thus retain the motor key in depressed position.

The release of arm 119 from the cam disk 174, permits it to rotate slightly, and thereby through parts described in said prior application to clutch the motor to the machine driving devices. This rotation also closes the motor circuit through parts next to the be described. An arm 180 is pivoted on a pin 181 and carries an insulating bar 186, directly over switch contacts 182 and 183, and a depression of said arm 180 will lower the contacts 182 and 183 into connection with stationary contacts 184 and 185. In order to depress arm 180 a bell crank lever 176 is pivoted on a pin 177 and bears a roller 175 engaging the cam disk 174. A cam extension of said arm 180 bears on a roller 179, carried by depressing arm 180. When the cam disk 174 is released and slightly rotated, as before described, the movement of the cam rocks lever 176, thereby depressing arm 180 and forcing contacts 182 and 183 to engage contacts 184 and 185, thus closing the motor circuit.

The motor circuit is broken and the motor controlling parts are restored to position automatically by the motor, and just at the end of the operation. To this end a bar 197 having a curved edge 196 is pinned to the bell crank lever 120 and will evidently be moved rearwardly by the release of the latching arm 119. The gear 191 carries a restoring roller 195, which, as the gear nears the end of its rotation, will engage the curved surface 196 of arm 197, and push the arm forwardly, thus restoring arm 119 to latching position. As was before stated, these motor parts are disclosed in said prior application and are described herein merely for clearness.

The totalizer resetting mechanism is illustrated in Fig. 4. Total and sub-total keys 202 and 201 are fixed to a frame 203, which is pivoted on a frame pin 204 and is provided at its lower end with two cam slots 205 and 206. These slots coincide at one end and a roller 207 carried by an arm 208 normally extends through the slots at their juncture. The arm 208 is fixed to a shaft 209, which also carries an arm 210, which is connected by a link 211 with a lever 212, which is pivoted on a frame pin 213. The lever 212, is connected by a link 214 with the member 54, and, when the key 201 is depressed, the cam slot 205 will engage the roller 207 and thereby rock the arm 208 downwardly far enough to cause the member 54 to be rocked rearwardly enough that the space 215 between the cup shaped flanges 55 and 216 of the members 4 will come opposite the pin 56. Therefore, when the member 57 is rocked upwardly from its pivot 52 it will not carry the member 54 upwardly and for this reason the cam arms 46 (Figs. 10 and 9), will not cause the totalizer, which is meshing with the gears 60, to be moved out of mesh. The depression of the sub-total key 201 also causes a projection 217 of the frame 203 to move from beneath a pin 218 of a bell crank lever 219, and thereby permit a spring 220 which is connected to said lever by a link 221 to rock the lever so that the pin 218 will enter the notch 222 of the frame 203, and thereby hold the frame in its moved position. The bell crank lever 219 is fixed to the shaft 223 which carries the series of arms 224, provided with pins 225 extending over the shoulders 226 of the arms 23. Therefore, when said lever 219 is rocked by the spring 220, the arms 23 will be rocked to carry all of the zero plungers 24 out of the paths of the segments. The zero plunger pins 22 which are carried by the arms 23 at the same time enter the notches 227 of the levers 18, and thereby prevent depression of any of the amount keys as the lever cannot then rock rearwardly around its pivot 20.

By the rotation of the drive shafts the segment controlling rod 25 moves upwardly as usual permitting the segment 10 to follow under the action of their springs 35. But during this time as none of the plungers 6 are in the paths of the segments 10, the extent of upward movement of the segments will be determined by the transfer trip pins 63, which are carried by the totalizer pinions (see Fig. 11), as the totalizer pinions are meshed with the gears 60 and, therefore, will be backwardly rotated upon the rise of the segments 10, but are stopped by the pins 63 engaging the under side of the shoulders 64, of the transfer pawls. By this construction, the segments 10 move upwardly distances which correspond to the total amount which had been added to the particular totalizer, which is meshed with the gears 60. The type carriers are set in the usual way and the impression which is then made indicates the total amount which had been added to this particular totalizer. When the rod 25 is returned to its lower position, the segments 10 are, of course, returned to their zero positions, and thereby cause the totalizer to be again rotated forwardly to its original position.

The foregoing operation causes printing of the total, but it does not permit the totalizer to remain in zero position. By depressing the total key 202, instead of the sub-total key 201, the total will be printed and the totalizer will be reset to zero and permitted to remain in its zero position. The difference between the operations is merely that in the latter, the totalizer is moved out of mesh with the gears 60 when the segments 10 are locked in their moved positions. By depressing the total key 202, the frame 203 is rocked so that the slot 206 will act upon the roll 207. Therefore, the arm 208 will be rocked far enough to cause the member 54 to be rocked rearwardly far enough to bring the cup shaped flange 216 over a pin 56 which is carried by an arm similar to 57, but which is actuated by a cam 228 (Figs. 10 and 17), similar to the cam which operates the arm 57, but is set at an angular position upon the shaft 29 in such relation with the member 57 which it actuates that the cam arms 46 will be caused to move upwardly when the segments 10 are locked in their moved positions and thereby rock the totalizer out of mesh at such time. The arm 219 rocks downwardly to carry the pin 218 into the notch 229 when the total key 202 is depressed. Therefore, the zero plungers will be withdrawn from the paths of the segments 10 and the remainder of the plungers prevented from moving into their paths in the same manner as when the sub-total key 201 is depressed.

The cam 74, (Fig. 11) rocks all of the transfer pawl latching members 67 downwardly before the segments 10 begin to rock upwardly and thus all of the transfer pawls which have been tripped will be restored before the totalizer is rotated upon resetting operations, and it is, therefore, impossible for the pins 63 to pass shoulders 64 and thereby cause the printing of a false total. The race 32 of the cam 28 which causes the operation of the arms 33 which carry the rod 25 is concentric with the shaft of the cam at the point 230 to provide time for this resetting.

When any of the totalizers is rocked into mesh with the gears 60, the totalizer gears are alined by a pin 231 (Figs. 8 & 9), which are carried by an arm fixed to the right hand arm 48ᵇ. The meshing movement of the totalizer causes the pin 231 to enter one of the holes 234 in an alining member 235, which is carried by the totalizer shaft 48.

It may be seen from the drawings that the present invention, by the arrangement of multiple totalizers and the sliding intermediate actuators 43, provides a very simple and compact multiple totalizer accounting machine.

A modification of the transfer mechanism is shown in Figs. 15 and 16, the principle advantage of which is that it will permit the operation of more than one totalizer at once, which is clearly not possible with the form of Fig. 11. The main difference in construction is that the narrow and wide gears 600 and 430 are not fastened together, but are loosely held together by a spring 660 connecting a pin 662 on gear 430 with a pin 661 on gear 660. A pin 431 fast on gear 430 rides in a slot in gear 600, the slot having an angular extent equal to the angle between two adjacent teeth.

The transfer controlling arm 620 has an upper surface 650 engaging a pin 610 on gear 600, and this arm is adapted to be rocked out of the path of pin 610 by a pin 630 on the totalizer wheel 450. A pivoted arm 670 has a notch 690 adapted to retain the transfer arm 620 in tripped position.

It will, of course, be understood that the modified parts thus far described are duplicated for each denomination in the machine. When the machine is operated the segments 440 are finally returned to zero position, thus driving the gears 430. If no transfer is required, the gears 600 will return with the gears 430 (the tension of springs 660 being sufficient to drive the said gears 600 and the totalizer gears) until the pins 610 engage the surface 650 of the transfer arms 620. At this point the gears 600 will stop, leaving gears 430 to make an additional step movement, as permitted by the slot in gear 430. If a transfer is required, the pins 610 will not be obstructed by arms 620 and the gears 600 and, therefore, the totalizer gears 450, may have an excess step of movement, the transfer trip pins 630 having engaged the arms 620, and moved their upper surfaces out of the paths of pins 610.

Clearly the mechanism to the right (Fig. 15) of the driving segments may be duplicated several times in one machine thus permitting actuation of more than one totalizer at once.

*Operation.*—Briefly stated, the operation of the machine is as follows: In adding amounts to any of the totalizers and printing the record of the amounts which are so added, the lever 76 is adjusted so that the gears 60 will be brought to operative relation with the desired totalizer upon the operation of the machine. The amount keys 1, which represent the amount to be added, are depressed and then the motor key 27. The depression of the motor key 27 effects the closing of the motor switch at 184 and 185, and thereby starts the operation of the motor which causes the shafts 29, 34 and 86 to make a complete rotation. The cam arms 46 are then lifted upwardly, causing the totalizers to be moved rearwardly in a horizontal plane so that none of the totalizer pinions will mesh with the gears 60. The shaft 48ᵃ is then moved into a longitudinal direction bringing the gears 60 opposite the totalizer elements to which the amount is to be added. The shifting of the intermediate actuators comprising the broad gears 43 and the narrow gears 60 is controlled by the handle 76 and the mechanism for shifting the shaft 48ᵃ, as illustrated in Figs. 2 and 9. The mechanism shown in Fig. 2, also causes the corresponding detail strip to be brought opposite the printer 143. The rod 25 is then swung upwardly permitting the segments 10 of the banks in which keys have been depressed to rock upwardly until the same engage the plungers which have been projected into their paths by the depression of keys. The segments 10 are then locked in their moved position by the alining bar 37. While the segments 10 are locked in their moved positions, the type segments 159 are set by the cams 157 or 163, to correspond to the extents of upward movement of the segments 10, and, therefore, when the printing hammers are operated, the amount which is printed will correspond to the amount represented by the depressed keys. At the same time that the type carriers 159 are being set, the cam arms 46 are returned to their lower positions, thereby meshing the totalizer elements 45 with gears 60 which have been brought opposite thereto. The alining bar 37 is then rocked away from the teeth 38 of the segments 10 and the rod 25 is returned to its initial position, thereby returning all of the segments 10 to their zero positions. The segment gears 44, which are carried by the segments 10, at this time cause the rotation of the intermediate gears 43, and through them and the gears 60 cause a corresponding rotation in a forward direction of the totalizer, which meshes with the gears 60. If, during the forward rotation of the totalizer, any of the totalizer pinions pass from the "nine" position to the "zero" position, the pins 63, which are carried by such pinions, will engage their respective transfer pawls 62 and cause the same to rock out of the paths of the pins 61, of the intermediates 43 of next higher order than such pinions. These intermediates will then rotate an additional tooth space as urged by their segment gears 44 under the action of their springs 66. The totalizer pinions, of course, pass from nine to zero at the end of a complete rotation. Therefore, such rotation is recorded upon the pinions of next higher order by means of the additional movement imparted to the intermediate actuators by their segment gears, as previously described. If, at any time, it is desired to print a subtotal of the amount which has been added to any one of the totalizers, the machine is operated after setting the handle 76 so that upon the rotation of the drive shafts, the desired totalizer will be brought opposite the gears 60. After the handle 76 is set, the motor key is depressed, permitting the machine to be idly operated, and all that the machine does in this operation is to bring the desired totalizer into operative relation with the actuators. Then the machine is again operated after depressing the subtotal key 201, and returning the handle 76 to the position in which it has been set upon the idle operation of the machine by then depressing the motor key 27. In such operation the totalizer will be permitted to remain in mesh with the actuators during the upward and return movements of the segments 10. The segments 10 are limited in their upward movement by the backward rotation of the totalizer pinions, which, when reaching their zero positions, are stopped by the transfer pawls 62 engaging the pins 63 which are carried by the totalizer pinions. The type carriers will be set as usual according to the extent of upward movement of the segments 10. Therefore, the total amount which had been added to the totalizer will be printed upon its corresponding detail strip. Upon the return of the segments 10, the totalizer pinions will also be returned to their prior positions. If it is desired to reset any one of the totalizers, the machine is operated in precisely the same way with one exception, that is, that the total key 202 is depressed instead of the subtotal key 201. The depression of this key sets the mechanism for moving the totalizer out of mesh with the gears 60 when the segments 10 are at rest in their upper positions, and the totalizer is in its zero position.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In an accounting machine, the combination with a plurality of totalizing devices each comprising a plurality of denominational elements, of differential mechanism and means for differentially actuating the same, intermediate alined actuators adapted to transmit the differential movement of the differential mechanism to each of the elements of any one of the totalizing devices, and means for positioning the intermediate actuators so that any desired one of the totalizing devices will be operated upon operation of the differential mechanism.

2. In an accounting machine, the combination with a plurality of totalizing devices, of differential mechanism and means for actuating the differential mechanism, intermediate alined actuators, each of said intermediate actuators comprising a broad gear and a narrow gear, and means for positioning the intermediate actuators so that any desired one of the totalizers will be operated upon the operation of the differential mechanism.

3. In an accounting machine, the combination with a plurality of totalizing devices, of differential mechanism and means for differentially actuating the same, intermediate actuators, each of said intermediate actuators comprising a broad gear and a narrow gear secured together, the broad gear meshing with the differential mechanism, the narrow gear adapted to mesh with an element of any one of the totalizers and means for moving the intermediate actuators in an axial direction for the purpose of causing the narrow gears of the actuators to be brought to operative relation with any desired totalizer.

4. In an accounting machine, the combination with a plurality of totalizing devices of differential mechanism, means for actuating the differential mechanism, intermediate actuators, each of said intermediate actuators comprising a broad gear and a narrow gear, one of said gears adapted to mesh with the differential mechanism, and the other of said gears adapted to mesh with an element of any one of the totalizers, and means for shifting the intermediate actuators in a longitudinal direction for the purpose of operatively connecting the differential mechanism with any desired totalizer.

5. In an accounting machine, the combination with a plurality of totalizing devices, said totalizing devices so arranged that the elements of like denominations of the totalizers are arranged in groups, differential mechanism, means for actuating the differential mechanism, intermediate actuators comprising a plurality of broad gears, each of which gears carries a narrow gear but of greater diameter than the broad gears, the broad gears arranged to mesh with the differential mechanism and the narrow gears arranged to mesh with the totalizers, and means for shifting the intermediate actuators in an axial direction for the purpose of meshing the same with any desired totalizer.

6. In a machine of the class described, the combination with differential mechanism including segment gears, of intermediate actuators comprising broad gears each having a narrow gear of greater diameter fast thereto, a shaft on which said gears are loosely mounted so that said broad gears are in mesh with said segment gears, means for sliding said shaft and gears axially, a plurality of totalizers in groups of denominationally adjacent elements, and means for meshing any desired one of each group of totalizer elements with the corresponding narrow gear.

7. In an accounting machine, the combination with a plurality of totalizers, each comprising a plurality of movable elements, of a set of differentially movable devices common to all of said totalizers, and alined means for connecting the elements of any one of the totalizers with the differentially movable devices while preserving the relative positions of the said devices and the totalizers.

8. In an acounting machine, the combination with a plurality of totalizers, each comprising a plurality of movable elements, of a set of differentially movable devices common to all of said totalizers, and alined gears constantly in engagement with the differentially movable devices for driving the elements of any of the totalizers.

9. In an accounting machine, the combination with a plurality of totalizers, each comprising a plurality of movable elements, of a set of differentially movable devices common to all of said totalizers, alined sliding gears constantly in engagement with the differentially movable devices for driving the elements of any of the totalizers, and a manipulative device for controlling the sliding of the gears to bring said gears into engagement with the elements of any of the totalizers.

10. In an accounting machine, the combination with a plurality of totalizers, each comprising a plurality of movable elements, of a set of differentially movable devices common to all of said totalizers, alined means for connecting the elements of any of the totalizers with the differentially movable devices while preserving the relative positions of said devices and totalizers, and a manipulative device controlling the connecting means and thereby determining the totalizers to be actuated by the differentially movable devices.

11. In an accounting machine, the combination with a plurality of totalizers, each comprising a plurality of movable elements, of differentially movable devices common to all of said totalizers, means for shifting said devices thereby carrying them into engagement with the elements of any of the totalizers, and transfer controlling devices shiftable with the differentially movable devices.

12. In an accounting machine, the combination with a plurality of totalizers, each comprising a plurality of movable elements, of differentially movable devices common to all of said totalizers, means for shifting said devices thereby carrying them into engagement with the elements of any of the totalizers, resilent means for imparting an additional movement to the differentially movable devices to effect a transfer between the elements of the selected totalizer and devices shiftable with the differentially movable devices for controlling the resilient means.

13. In an accounting machine, the combination with a plurality of totalizers, each comprising a plurality of movable elements, of differentially movable devices common to all of said totalizers, means for shifting said devices thereby carrying them into engagement with the elements of any of the totalizers, resilient means for imparting an additional movement to the differentially movable devices to effect a transfer between the elements of the selected totalizer, trip pawls, and retaining members therefor shiftable with the differentially movable devices for controlling the resilient means.

14. In an accounting machine, the combination with a plurality of totalizers, each comprising a plurality of movable elements, of mechanism for differentially actuating the same, a set of intermediate actuators adapted to transmit the movement of the differential mechanism to any one of the totalizers, means for positioning the intermediate actuators so that any desired one of the totalizers will be operated upon the operation of the differential mechanism, means for imparting an additional movement to the intermediate actuators to effect a transfer between the elements of the selected totalizer and devices positioned with the intermediate actuators for controlling the transfer means.

15. In an accounting machine, the combination with a plurality of totalizers, each comprising a plurality of movable elements, of mechanism for differentially actuating the same, a set of intermediate actuators adapted to transmit the movement of the differential mechanism to any one of the totalizers, each of said intermediate actuators comprising a broad gear and a narrow gear, means for positioning the intermediate actuators so that any desired one of the totalizers will be operated upon the operation of the differential mechanism, means for imparting an additional movement to the intermediate actuators to effect a transfer between the elements of the selected totalizer, and devices positioned with the intermediate actuators for controlling the transfer means.

16. In an accounting machine, the combination with a plurality of totalizing devices each comprising a plurality of movable elements, of differential mechanism and means for differentially actuating the same, and a set of alined intermediate actuators adapted to transmit the differential movement of the differential mechanism to the elements of any one of the totalizers.

17. In an accounting machine, the combination with driving mechanism, of a plurality of accounting devices, differential mechanism, devices adapted to transmit motion from the differential mechanism to any of said accounting devices, positioning mechanism for said transmitting devices receiving power from the driving mechanism, and a manipulative device for controlling said positioning mechanism.

18. In an accounting machine, the combination with a driving mechanism, of a plurality of totalizers, a printing mechanism, a paper carriage, differential mechanism for the totalizers and the printing mechanism, devices for transmitting motion from the differential mechanism to any of the totalizers, means operated by the driving mechanism for selectively positioning said transmitting devices to operate on a desired totalizer and for correspondingly positioning the paper carriage, and a manipulative device for controlling said means.

19. In an accounting machine, the combination with a plurality of totalizing devices each comprising a plurality of elements arranged in groups each group including the elements of like denomination of all of the totalizing devices, an actuator appropriate to each group, an intermediate actuator appropriate to each actuator adapted to transmit the differential movement of the actuator to any desired one of the elements in its appropriate group, and means for positioning the intermediate actuators to place the elements composing any desired one of the totalizers in coöperative relation with the actuators.

20. In an accounting machine, the combination with a plurality of totalizing devices each comprising a plurality of elements arranged in groups each group including the elements of like denomination of all of the totalizing devices, an actuator appropriate to each group, an intermediate actuator appropriate to each actuator and comprising a broad gear and a narrow gear adapted to transmit the differential movement of the actuator to any desired one of the elements in its appropriate group, and means for positioning the intermediate actuators to place the elements composing any desired one of the totalizing devices in coöperative relation with the actuators.

21. In an accounting device, the combination with a plurality of totalizing devices each comprising a plurality of elements arranged in groups each group including the elements of like denomination of all of the totalizing devices, an actuator appropriate to each group, an intermediate actuator appropriate to each actuator and comprising a broad gear and a narrow gear secured together, the broad gear of each intermediate actuator meshing with its appropriate actuator, the narrow gear adapted to mesh with any desired one of the elements of the appropriate group, and means for moving the intermediate actuators in an axial direction for the purpose of causing the narrow gears to be brought to operative relation with the elements composing any desired one of the totalizing devices.

22. In an accounting machine, the combination with a plurality of totalizing devices each comprising a plurality of elements arranged in groups each group including the elements of like denomination of all of the totalizing devices, an actuator appropriate to each group, an intermediate actuator appropriate to each actuator and comprising a broad gear and a narrow gear, one of said gears adapted to mesh with the actuator and the other of said gears adapted to mesh with one of the elements of its appropriate group, and means for shifting the intermediate actuators in a longitudinal direction for the purpose of operatively connecting the actuators with the elements composing any desired totalizer.

23. In an accounting machine, the combination with a plurality of totalizers each comprising a plurality of elements arranged in groups each group including the elements of like denomination of all of the totalizing devices, a differentially adjustable actuator appropriate to each group, adjustable means intermediate each actuator and its appropriate group whereby coöperative relation may be established between the actuator and any desired one of the elements composing the group, and means for moving all of said intermediate means to establish coöperative relation between said actuators and the element of each group composing any desired one of said totalizers.

24. In an accounting machine, the combination with a plurality of totalizing devices each comprising a plurality of elements arranged in groups each group including the elements of like denomination of all of the totalizing devices, a set of differentially movable devices each appropriate to one of said groups, a set of gears each appropriate to one of said movable devices and constantly in engagement therewith, and means for adjusting said gears relative to said movable devices whereby to establish a coöperative relation between said devices and the elements of each group which compose the desired totalizer.

25. In an accounting machine, the combination with a plurality of totalizing devices each comprising a plurality of elements arranged in groups each group including the elements of like denomination of all of the totalizing devices, of a set of differentially movable devices each appropriate to one of said groups, a plurality of sliding gears each appropriate to one of said movable devices and constantly in engagement therewith for driving the elements of its appropriate group, and manipulative means for sliding said gears to bring the same into engagement with the elements of each group which compose any desired one of the totalizers.

26. In an accounting machine, the combination with a plurality of totalizing devices each comprising a plurality of elements arranged in groups each group including the elements of like denomination of all of the totalizing devices, of a set of differentially movable devices common to all said totalizers and each appropriate to one of said groups, means for connecting the elements composing any of said groups with their appropriate movable device while preserving the relative positions of said devices and elements, and a manipulative device controlling the connecting means whereby to establish a coöperative relation between said movable devices and the elements of each group composing a desired totalizer.

27. In an accounting machine, the combination with a plurality of totalizing devices each comprising a plurality of elements of different denominational order, of a plurality of actuators each appropriate to a certain denominational order and common to all of the totalizing elements of like denominational order, means for differentially actuating the actuators, and a set of intermediate actuators each appropriate to one of said actuators and adapted to transmit the differential movement thereof to the elements of appropriate order of the several totalizers.

28. In an accounting machine, the combination with a plurality of totalizing devices, of differential mechanism and means for differentially actuating the same, a set of intermediate actuators adapted to transmit the differential movement of the differential mechanism to any one of the totalizers, positioning mechanism for said transmitting actuators, and means for locking the said intermediate actuators in adjusted position during an operation of the selected totalizer.

29. In an accounting machine, the combination with a plurality of totalizing devices, differential mechanism and means for differentially actuating the same, a set of intermediate actuators adapted to transmit the differential movement of the differential mechanism to any one of the totalizers, means for positioning the intermediate actuators so that any desired one of the totalizers will be operated upon the operation of the differential mechanism, and means for locking said intermediate actuators in adjusted position during the operation of the selected totalizer.

30. In an accounting machine, the combination with a plurality of totalizing devices, of differential mechanism and means for actuating the differential mechanism, intermediate actuators each of said intermediate actuators comprising a broad gear and a narrow gear, means for positioning the intermediate actuators so that any desired one of the totalizers will be operated upon an operation of the differential mechanism, and means for locking said intermediate actuators in adjusted position during an operation of the selected totalizer.

31. In an accounting machine, the combination with a plurality of totalizing devices each comprising a plurality of elements arranged in groups each group including the elements of like denomination of all of the totalizing devices, an actuator appropriate to each group, an intermediate actuator appropriate to each actuator adapted to transmit the differential movement of the actuator to any desired one of the elements in its appropriate group, means for positioning the intermediate actuators to place the elements composing any desired one of the totalizers in coöperative relation with the actuators, and means for locking said intermediate actuators in adjusted position during an operation of the selected totalizer.

32. In an accounting machine, the combination with a plurality of totalizing devices, of differential mechanism and means for differentially actuating the same, a set of intermediate actuators adapted to transmit the differential movement of the differential mechanism to any one of the totalizers, a sliding frame carrying all of said intermediate actuators, and means for positioning said frame to establish coöperative relation between said intermediate actuators and any desired one of said totalizers whereby the latter will be operated upon the operation of the differential mechanism, and means for locking said sliding frame in adjusted position during an operation of the selected totalizer.

33. In an accounting machine, the combination with a plurality of totalizing devices, of differential mechanism and means for differentially actuating the same, a set of intermediate actuators adapted to transmit the differential movement of the differential mechanism to any one of the totalizers, a sliding frame for carrying said intermediate actuators, means for positioning said frame to establish coöperative relation between said intermediate actuators and any desired one of said totalizers, a locking plate mounted on the main frame of the machine and having locking apertures formed therein, and a pin carried by said sliding frame and adapted to coöperate with said locking apertures to lock said intermediate actuators in adjusted position during the operation of a selected totalizer.

34. In an accounting machine, the combination with a plurality of totalizing devices, of differential mechanism and means for differentially actuating the same, and a set of alined intermediate actuators adapted to receive different extents of movement simultaneously and independently of each other to transmit the differential movement of the differential mechanism to any one of the totalizers.

35. In an accounting machine, the combination with a driving mechanism, of a plurality of accounting devices, differential mechanism, alined devices adapted to receive different extents of movement simultaneously and independent of each other to transmit motion from the differential mechanism to any of said accounting devices, positioning mechanism for said alined transmitting devices receiving power from the driving mechanism, and a manipulative device for controlling said positioning means.

36. In a machine of the class described, the combination with a plurality of totalizing devices each comprising a plurality of elements arranged in groups each group including the elements of like denomination of all of the totalizing devices, of a set of actuators one for each group, and means for moving each actuator laterally into operative relation with any element in its group.

37. In a machine of the class described, the combination with a plurality of totalizing devices each comprising a plurality of elements arranged in groups each group including the elements of like denomination of all of the totalizing devices, of a set of actuators therefor, a frame for carrying said actuator, and means for moving said frame laterally relative to the totalizing devices, to bring the actuators into position to actuate the various totalizing devices.

38. In a machine of the class described, the combination with a plurality of totalizing devices each comprising a plurality of elements arranged in groups each group including the elements of like denomination of all of the totalizing devices, of a shaft supporting said elements in horizontal alinement, a set of actuators one for each group of elements movable simultaneously and independently of each other, a laterally movable frame for carrying said actuators, and means for shifting said frame laterally to bring the actuators into position to actuate the various totalizing devices.

39. In a machine of the class described, the combination with a plurality of totalizing devices each comprising a plurality of elements arranged in groups each group including the elements of like denomination of all of the totalizing devices, of a set of laterally movable actuators one for each group of elements, and a manipulative device for controlling lateral movement of the actuators to bring said actuators into operative relation with the elements of any of the totalizing devices.

40. In a machine of the class described, the combination with a driving mechanism, of a plurality of totalizing devices each comprising a plurality of elements arranged in groups each group including the elements of like denomination of all of the totalizing devices, of a set of laterally movable actuators one for each group of elements, and means driven by the driving mechanism for moving said actuators laterally into coöp- erative relation with the elements of any one of the totalizing devices.

41. In a machine of the class described, the combination with a plurality of totalizing devices each comprising a plurality of elements arranged in groups each group including the elements of like denomination of all of the totalizing devices, of laterally movable actuators one for each group of elements, a driving mechanism for the actuators, means driven by the driving mechanism for laterally moving the actuators into coöperative relation with the elements of any one of the totalizing devices, and manipulative means for controlling said moving means.

42. In a machine of the class described, the combination with a plurality of totalizing devices each comprising a plurality of elements arranged in groups each group including the elements of like denomination of all of the totalizing devices, laterally movable alined actuators one for each group of elements, and means for moving the actuators laterally into position to actuate any one of the various totalizing devices.

43. In a machine of the class described, the combination with a plurality of totalizing devices each comprising a plurality of elements arranged in groups each group including the elements of like denomination of all of the totalizing devices, of a set of laterally movable alined actuators one for each group of elements, and a manipulative device for controlling lateral movement of the actuators to bring said actuators into operative relation with the elements of any of the totalizing devices.

44. In a machine of the class described, the combination with a plurality of totalizing devices, each comprising a plurality of elements arranged in groups each group including the elements of like denomination of all of the totalizing devices, of laterally movable actuators one for each group of elements, means for shifting the actuators into position to actuate any one of the various totalizing devices, and transfer controlling devices shiftable with the actuators.

45. In a machine of the class described, the combination with a plurality of totalizing devices each comprising a plurality of elements arranged in groups each group including the elements of like denomination of all of the totalizing devices, of a set of actuators one for each group of elements, a paper carriage, printing mechanism, and means for moving the actuators to position them in coöperative relation with the elements of any one of the totalizing devices and for correspondingly positioning the paper carriage.

46. In a machine of the class described, the combination with a plurality of totalizers each comprising a plurality of elements arranged in groups each group including the elements of like denomination of all of the totalizers, of differential mechanism and means for actuating the differential mechanism, intermediate actuators one for each group and each having a single driving connection to be engaged selectively with the corresponding elements of any of the totalizers, and means for moving the single connection of each intermediate actuator into operative relation with any element of its corresponding group.

47. In a machine of the class described, the combination with a driving mechanism, of a plurality of totalizers, a set of laterally movable actuators adapted to operate any one of said totalizers, and means driven by the driving mechanism for moving said actuators laterally to bring them into operative relation with the desired totalizer.

48. In a machine of the class described, the combination with a driving mechanism, of a plurality of totalizers, a shaft, a set of actuators mounted in horizontal alinement on said shaft and operable independently and simultaneously to actuate any one of the totalizers and means driven by the driving mechanism for moving said shaft laterally to bring the actuators into operative relation with the desired totalizer.

49. In a machine of the class described, the combination with a driving mechanism, of a plurality of totalizers, a set of actuators adapted to operate any one of said totalizers, means driven by the driving mechanism for differentially moving said actuators laterally to bring them into operative relation with the desired totalizer, and manipulative means adjustable as a preliminary to the operation of the machine for predetermining the extent of lateral movement of the actuators.

50. In a machine of the class described, the combination with a plurality of totalizers, of differential mechanism and means for actuating said differential mechanism, intermediate actuators one for each element of a totalizer and having a single driving connection to be engaged selectively with, so as to selectively drive from the differential mechanism, corresponding elements of all of the totalizers, and means for moving the single driving connection of each intermediate actuator into operative relation with the corresponding element of any of the totalizers.

51. In a machine of the class described, the combination with an operating mechanism, of a plurality of totalizers, differential devices for the same actuated by the operating mechanism, intermediate actuators adapted to be positioned to transmit the differential movement of the differential mechanism to any one of the totalizers, means driven by the operating mechanism for positioning said intermediate actuators, a lever adjustable as a preliminary to an operation of the machine to control the positioning of said intermediate actuators, and means for automatically returning said lever to a normal position at the end of the operation of the machine.

In testimony whereof we affix our signatures in the presence of two witnesses.

CHARLES F. KETTERING.
WILLIAM A. CHRYST.

Witnesses:
R. RUMMLER,
F. E. HAMILTON.